July 1, 1941. C. C. WARREN 2,247,537
APPARATUS FOR MOLDING SEAMLESS HOLLOW OBJECTS
Filed June 6, 1940 2 Sheets-Sheet 1
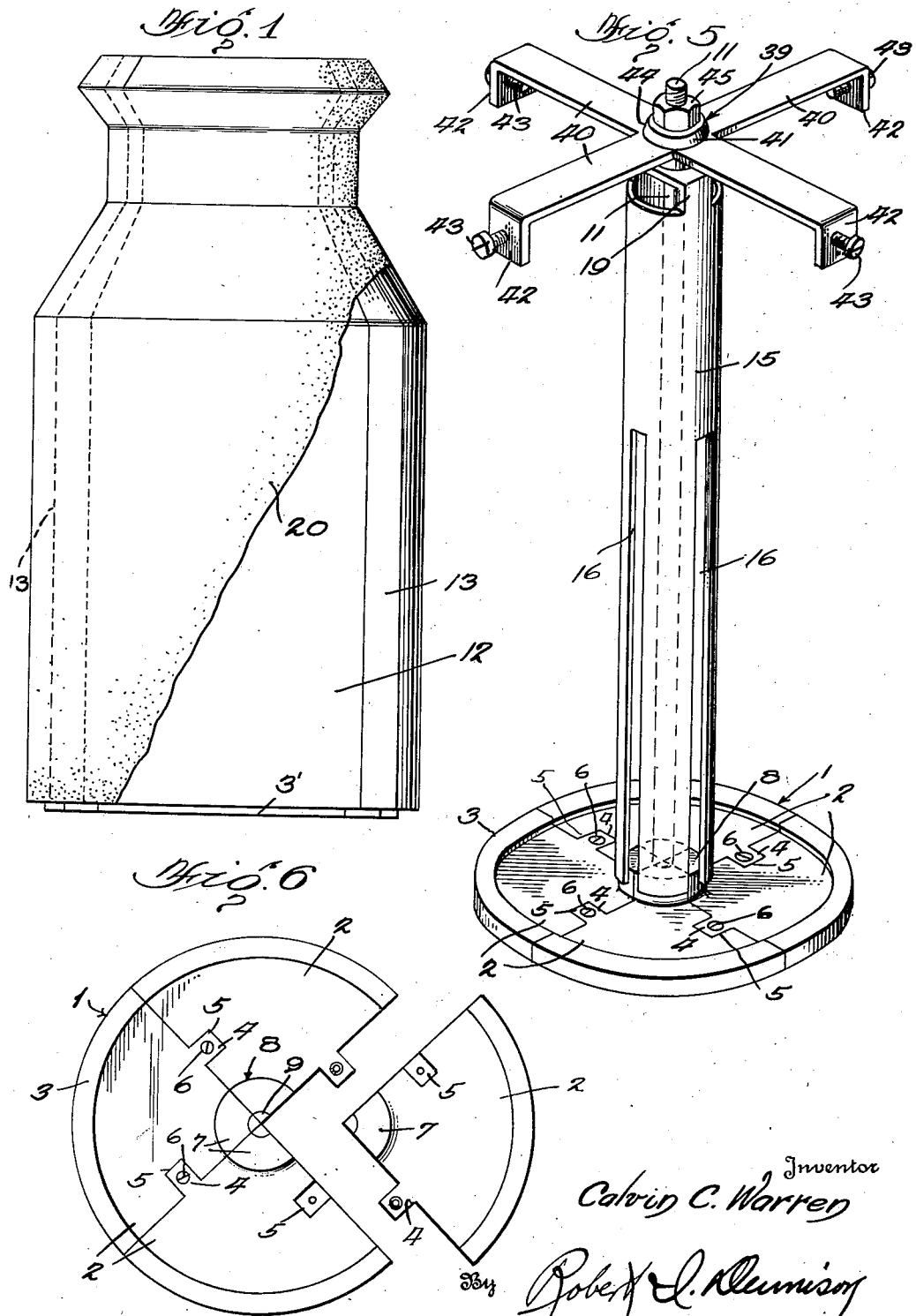
Inventor
Calvin C. Warren
By Robert J. Dennison
Attorney July 1, 1941.  C. C. WARREN  2,247,537
APPARATUS FOR MOLDING SEAMLESS HOLLOW OBJECTS
Filed June 6, 1940  2 Sheets-Sheet 2
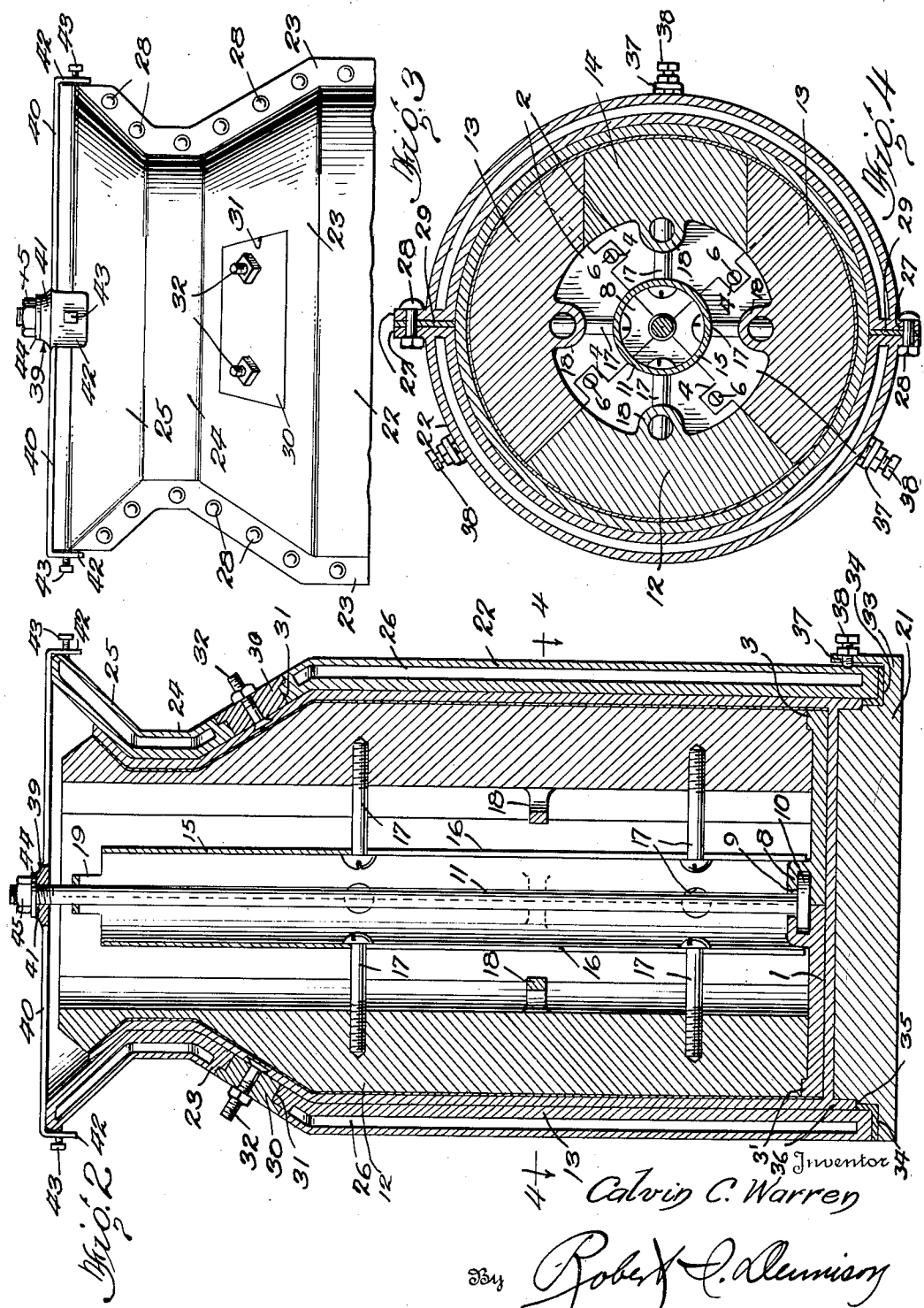
Inventor
Calvin C. Warren
By Robert C. Dennison
Attorney Patented July 1, 1941

2,247,537

UNITED STATES PATENT OFFICE 2,247,537

APPARATUS FOR MOLDING SEAMLESS HOLLOW OBJECTS

Calvin C. Warren, Rochester, N. Y., assignor of one-fourth to Ronald G. Saunders and one-half to J. Arthur Jennings, both of Irondequoit, N. Y.

Application June 6, 1940, Serial No. 339,186

5 Claims. (Cl. 22—152)

This invention relates to an apparatus for molding seamless hollow objects such as milk cans, it being understood that while a milk can has been shown as the hollow object being molded the invention is not limited to such use.

The present invention relates to certain improvements in the molding apparatus disclosed in my prior Patent No. 2,101,768, dated December 7, 1937.

One object of the invention is to provide a molding apparatus consisting of companion elements or parts which may be easily and quickly assembled in cooperating relation to each other and form a collapsible mold having an inner core and an outer shell spaced from the sides and bottom of the core so that a space will be provided in which the milk can or other hollow object will be formed.

Another object of the invention is to provide a mold, wherein the inner core is suspended within the outer shell by a rod carried by a hanger or yoke and is adjustable vertically, so that the core may be disposed a predetermined distance above the bottom or base of the outer shell whereby the milk can will be formed with a bottom of desired thickness.

Another object of the invention is to provide a mold having its inner core formed of a base and side walls formed of sections which may be easily taken apart for removal after the milk can has been molded.

Another object of the invention is to provide the mold with a central sleeve or column disposed about the supporting rod, concentric thereto and engaging pins extending inwardly from the wall sections to hold the wall sections in operative relation to each other, the sleeve or column being held in centered relation to the rod and the annular wall of the core and being easily removable after the milk can has been molded.

Another object of the invention is to so form the bottom of the core, that the sections thereof may be detachably secured in operative relation to each other and portions thereof held in engagement with a head at the lower end of the suspending rod.

It is another object of the invention to provide a mold of such construction that a milk can formed therein will have smooth inner and outer surfaces when finished.

A still further object of the invention is to provide a molding apparatus that will enable a milk can to be formed which will be seamless and which will afford maximum strength with a minimum of material and having an internal surface free of edges or crevices which would prevent thorough cleaning thereof or assist in the adherence of dirt or other foreign matter.

Other objects and advantages of the invention will become apparent from the accompanying drawings and following description.

The invention is illustrated in the accompanying drawings wherein:

Figure 1 is a view showing the inner core in side elevation with a portion of the asbestos covering therefor broken away;

Figure 2 is a sectional view taken vertically through the improved mold and showing the metal from which the milk can is formed poured therein;

Figure 3 is a view in elevation of the upper portion of the mold;

Figure 4 is a sectional view taken horizontally through the mold along line 4—4 of Figure 2;

Figure 5 is a perspective view of the inner core with the wall sections removed, and Figure 6 is a plan view of the base of the inner core, one section thereof being detached.

The present improved molding apparatus includes briefly, a core and an outer shell, each being formed of companion elements which are detachably assembled in order that the core and the shell may be taken apart and easily removed after a milk can or other hollow object has been formed in the mold.

The core has a bottom or base 1, formed of metal or other suitable material and consisting of segmental sections 2 which fit together as shown in Figures 5 and 6 to form a circular base or bottom having an upstanding flange or bead 3 about its periphery. Tongues or lugs 4 extend laterally from the side edges of the sections 2 for engagement in recesses 5 formed in the complementary edge portions of the adjacent sections, and when the screws 6 are applied and tightened the sections 2 will be firmly held together but are permitted to be easily released when the bottom is to be removed from a completed can.

Ears 7 extend upwardly from the intersecting inner ends or apices of the sections 2 and engage each other to form a socket 8 having an opening 9 at its center. This socket receives the enlarged head 10 at the lower end of a rod 11, and since the head is fitted into the socket during assemblage of the bottom sections 2, it will be confined therein and prevented from moving out of the socket until the screws 6 are removed and the bottom sections moved out of bottom-forming relation to each other.

The wall of the core consists of companion sections 12, 13 and 14, and while they are all of segmental outline in cross section, it should be noted that the sections 13 extend circumferentially of the core a greater distance than section 12 and terminate in side faces which are parallel to each other when the sections are in place and have face to face engagement with the parallel side faces of the section 14. Side faces of the section 12 and the side faces of the sections 13 abutting the same extend radially of the core.

By so forming the wall of the core the sections thereof may be easily assembled and a tight wedging fit established which will prevent leakage of metal between confronting side faces of the sections. The bottom faces of the core sections are recessed about their outer peripheries to form a circumferentially extending seat 3', into which fits the upstanding bead or flange 3 of the bottom 1 to maintain the wall properly seated upon the bottom in concentric relation thereto. Packing strips of thin asbestos or other suitable material are preferably placed between the confronting side faces of the core sections to form tight joints between the sections when they are assembled.

The core sections must be firmly secured in assembled relation to each other. In order to do so, there has been provided a sleeve or tube formed of strong metal. This sleeve or tube is of a diameter adapting it to fit snugly about the socket 8, and of such length that its upper end terminates short of the open upper end of the core (see Figure 2). Slots 16 extend longitudinally of the tube from the lower end thereof and are of such width that they snugly receive the radially disposed screws 17 carried by and extending inwardly from the wall sections of the core. Each wall section has been shown as being provided with two such screws but it is to be understood that additional screws may be provided if so desired.

When the screws are engaged through the slots 16 their heads have close contacting engagement with the inner surface of the tube at opposite sides of the slots and a pull will be exerted upon the screws to hold the core sections firmly in engagement with each other. If so desired, hooks may be used for engaging through the eyes 18 formed on the inner apices of the core sections in place of the screws.

At its upper end, the sleeve or tube 15 carries a bridge piece 19 which extends diametrically across the tube and is formed with an opening through which passes the upper portion of rod 11. This bridge maintains the tube concentric with the rod and also secures proper centering of the tube and the rod within the core. The outer surface of the assembled core is wrapped or covered with thin asbestos paper 20 to cover the cracks between the wall sections and cause a milk can or other hollow object formed about the core to have a smooth inner surface.

The outer shell of the mold has a base 21 and an annular wall formed of semi-circular sections 22 which cooperate with each other to form a shell which is circular in cross section, as shown in Figure 4, and has its upper portion tapered to form a circumferentially extending shoulder 23 carrying an upwardly extending neck 24 terminating in a flared mouth 25. The two sections 22 are hollow, as shown at 26, to form a water jacket through which water is circulated to cool the outer mold casing or shell and in order that the sections 22 may be secured to each other, they are formed with outstanding side flanges 27, through which bolts 28 are passed to draw the flanges and edge faces of the shell sections toward each other into tight compressing engagement with sealing gaskets 29 formed of thin asbestos or other suitable fire proof material interposed therebetween.

Blocks or plates 30 are set into openings 31 formed in the shoulders 23 of the shell sections and carry bolts 32. The heads of the bolts project from the inner faces of the plates so that when a milk can or the like is cast in the mold between the core and the outer shell the boltheads will be embedded in the metal forming the shoulder portion of the can. Therefore, when the nuts are removed from the bolts and the plates withdrawn from openings 31, prior to detaching and removing the outer shell sections, the bolts will remain in engagement with the can and project outwardly therefrom to serve as means for securing handles to the can.

The base 21 of the outer shell is thick and about its periphery is formed with an outstanding circumferentially extending lip 33 carrying a gasket 34 of fire proof material upon which the lower ends of the shell sections rest, as shown in Figure 2, to form a tight seal. The upstanding inner edge portion of the gasket terminates flush with a shoulder 35 extending circumferentially about the base midway the depth thereof to form the can with a bottom flange 36. In spaced relation to each other about its circumference, the base carries upstanding tongues 37 carrying set screws 38 for engaging the shell sections, which when tightened, firmly but detachably hold the shell sections and the base in engagement with each other.

The inner mold member or core must be suspended within the outer shell and thus maintained in spaced relation to the base and wall sections of the outer shell to provide a space adapted to be filled with molten metal which cools and hardens in the mold to form a seamless milk can or other hollow object.

In order to suspend the core in the shell, there has been provided a yoke or spider 39 formed with arms 40 which radiate from a hub 41 and terminate in downturned fingers 42 carrying set screws 43 for gripping the mouth or throat of the shell and firmly holding the yoke in place thereon with its arms resting upon the upper edge of the mouth. The hub 41 is upwardly thickened and is formed with an opening through which slidably passes the threaded upper end of rod 11. A washer 44 and nut 45 are applied to the protruding upper end of the rod and when the nut is tightened it serves to draw the rod upwardly and exert a pull upon the upper wall of socket 8 to raise the bottom 1 of the core and support the core in predetermined spaced relation to the base 21 of the outer shell and the walls thereof. With the core so suspended in the outer shell molten metal can be poured into the space between the core and the shell to fill the space, as shown in Figure 2, and when the metal has cooled and hardened, a milk can of the desired shape and thickness will be formed. The mold can then be taken apart and removed from about and from within the formed can.

While I have shown the preferred embodiment of my invention, it is to be understood that various changes in the size, shape and arrangement of parts may be resorted to without departing from the spirit of the invention and the scope of the appended claims.

Having thus described the invention, what I claim is:

1. Molding apparatus for forming seamless hollow objects which comprises an inner hollow core, and an outer shell, each consisting of a base and an annular wall formed of segmental sections having side edge faces in face to face engagement with each other, a rod extending longitudinally in said core axially thereof and having its lower end detachably connected with the base of the core, a sleeve surrounding the rod in concentric spaced relation to the rod and the wall of the core, anchoring means in said core extending inwardly from the wall sections of the core radially thereof and detachably engaging the sleeve to releasably hold the wall sections in assembled relation to each other, a support over said core detachably carried by the outer shell, and means for adjustably suspending said rod from said support and shifting the rod longitudinally in the core to dispose the core in predetermined spaced relation to the base and walls of the shell.

2. Molding apparatus for forming seamless hollow objects which comprises an inner hollow core, and an outer shell, each consisting of a base and arcuate wall sections detachably engaging each other, the base of the core consisting of segmental sections detachably secured to each other and having side edge faces in confronting face to face engagement with each other, the base being provided with an upstanding socket at its center formed with a center opening, a rod extending vertically in said core and provided with a head at its lower end engaged in said socket with the lower end of the rod passing through the opening at the center of the socket, a support removably carried by the upper end of said shell and formed at its center with an opening slidably receiving the upper end of said rod, and a nut threaded upon the upper end of said rod and resting upon said support and constituting means to shift the rod vertically and hold the rod in an adjusted position with the core in predetermined spaced relation to the outer shell.

3. Molding apparatus for forming seamless hollow objects which comprises an inner hollow core, and an outer shell enclosing the core, each consisting of a base and wall forming sections detachably engaging each other, the base of the core consisting of segmental sections meeting at the center of the base and having their inner end portions formed with upwardly extending segmental members defining a socket formed with a central opening through its top, a rod extending vertically in said core and having its lower end entering the socket through the central opening thereof and formed with a head housed in said socket, anchoring members adjustably carried by and extending inwardly from wall sections of the core radially thereof and having headed free ends, a sleeve surrounding said socket with its lower end fitting snugly about said socket, said sleeve detachably receiving the headed ends of said anchoring members to releasably hold the wall sections of the core assembled, and a support carried by said shell and engaged by the upper end of said rod to support the core in predetermined spaced relation to the outer shell.

4. Molding apparatus for forming seamless hollow objects which comprises an inner hollow core, and an outer shell enclosing the core, each consisting of a base and wall forming sections detachably engaging each other, the base of the core consisting of segmental sections meeting at the center of the base and having their inner end portions formed with upwardly extending members defining a socket formed with a central opening through its top, a rod extending vertically in said core and having a head at its lower end housed in said socket, anchoring pins extending inwardly from the wall sections of said core and having heads at their free ends, a sleeve about said rod having its lower end fitting about said socket and being formed with longitudinally extending slots leading from its lower end and receiving said pins to hold the said wall sections in assembled relation to each other, and a support removably carried by the upper end of said shell and engaged by the upper end of said rod to suspend the rod therefrom for supporting the core in spaced relation to the base and wall of the shell.

5. Molding apparatus for forming seamless hollow objects which comprises an inner hollow core, and an outer shell enclosing the core, each consisting of a base and wall forming sections detachably engaging each other, the base of the core consisting of segmental sections meeting at the center of the base and having their inner end portions formed with upwardly extending members defining a socket formed with a central opening through its top, a rod extending vertically in said core and having a head at its lower end housed in said socket, anchoring pins extending inwardly from the wall sections of said core and having heads at their free ends, a sleeve about said rod having its lower end fitting about said socket and being formed with longitudinally extending slots leading from its lower end and receiving said pins to hold the said wall sections in assembled relation to each other, a bridge across the upper end of said sleeve formed with an opening through which the upper portion of the rod passes and serving to maintain the sleeve concentric to the rod, a support having a hub formed with an opening through which the upper end of the rod slidably passes and arms extending from the hub for resting upon the upper end of the shell, depending fingers at outer end of the arms for engaging the upper end of the shell and holding the support in place thereon, and a nut threaded upon the protruding upper end of the rod and resting upon the hub to hold the rod in a vertically adjusted position with the core in predetermined spaced relation to the bottom and wall of the shell.

CALVIN C. WARREN.